UNITED STATES PATENT OFFICE.

ALVAH W. HOLWAY, OF BOSTON, MASSACHUSETTS.

MEDICATED LOZENGE.

SPECIFICATION forming part of Letters Patent No. 349,591, dated September 21, 1886.

Application filed August 25, 1885. Serial No. 175,324. (No specimens.)

*To all whom it may concern:*

Be it known that I, ALVAH W. HOLWAY, a citizen of the United States, and a resident of Boston, in the county of Suffolk and State of Massachusetts, have invented certain new and useful Improvements in the Manufacture of Medicated Lozenges or Tablets, of which the following is a specification.

The invention has relation to an improvement in the manufacture of medicated lozenges or tablets.

Its distinctive novelty consists in the utilization of a tablet or lozenge of sugar, as a vehicle to contain or carry the article known as "acid calcium lactate," a description of which is contained in Watt's Dictionary of Chemistry.

In practice I take, say, one hundred pounds of sugar, either raw, refined, or maple, according to the flavor which it is desired to give to the tablet, with which I mix about a tea-spoonful of cream of tartar and, say, two gallons of water, and boil the whole until it reaches about 310° Fahrenheit, or a higher degree, if possible, without burning. Just before taking the mixture off I add a flavoring or color of any kind, if desired, after which the compound, while hot, is poured upon marble slabs, and before cooling I add the acid calcium lactate, in the form of a powder, in the proportions of about ten pounds of the acid calcium lactate to one hundred pounds of the compound, as described above, and knead the compound until the acid calcium lactate is thoroughly dissolved, and then treat it in the ordinary manner to form it into tablets or lozenges. Great care will be taken to add not more than about a tea-spoonful of cream of tar- tar to, say, a hundred pounds of sugar, as an excessive amount will materially prejudice the result. The sugar and acid calcium lactate may be used in many instances as a base, to which may be added mixtures for coughs, colds, dyspepsia, &c., or other ingredients used for medicinal purposes—as, for instance, I have found that by adding a suitable quantity of acid lactate of magnesia to the sugar and acid calcium lactate a superior laxative is produced.

In packing the goods it is desirable that the air be excluded as much as possible to prevent a possible tendency of the ingredients to evaporate.

While I recommend the use of the proportions which I have specified, I do not limit my claim to them, as they may be varied according to circumstances; and it is plain that ingredients other than I have mentioned may be added either before, simultaneously with, or after the acid calcium lactate without changing the nature of the tablet.

What I claim as my invention, and desire to secure by Letters Patent, is—

1. A tablet or lozenge consisting of sugar, cream of tartar, and acid calcium lactate, substantially as set forth.

2. A tablet or lozenge in which sugar and acid calcium lactate constitute a base, substantially as expressed.

Signed at New York, in the county of New York and State of New York, this 24th day of August, A. D. 1885.

ALVAH W. HOLWAY.

Witnesses:
GEORGE COOK,
CHAS. C. GILL.